United States Patent
Cardwell et al.

(10) Patent No.: US 9,552,934 B2
(45) Date of Patent: Jan. 24, 2017

(54) SLOT MOTOR, SLOT MOTOR COVER, SLOT MOTOR—ARC PLATE ASSEMBLY, AND METHODS OF OPERATION

(75) Inventors: Justin Michael Cardwell, Dacula, GA (US); James Edward Ferree, Lawrenceville, GA (US); Thomas William Holland, Flowery Branch, GA (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/371,770

(22) PCT Filed: Feb. 27, 2012

(86) PCT No.: PCT/US2012/026725
§ 371 (c)(1),
(2), (4) Date: Aug. 25, 2014

(87) PCT Pub. No.: WO2013/130035
PCT Pub. Date: Sep. 6, 2013

(65) Prior Publication Data
US 2015/0028973 A1 Jan. 29, 2015

(51) Int. Cl.
*H01H 9/44* (2006.01)
*H01H 3/26* (2006.01)
(Continued)

(52) U.S. Cl.
CPC ............... *H01H 3/26* (2013.01); *H01H 9/34* (2013.01); *H01H 77/108* (2013.01); *H02K 33/00* (2013.01);
(Continued)

(58) Field of Classification Search
CPC ...... H01H 9/36; H01H 2009/365; H01H 9/44; H01H 9/446; H01H 77/108
(Continued)

(56) References Cited

U.S. PATENT DOCUMENTS

| 4,743,720 A * | 5/1988 | Takeuchi .............. H01H 9/302 218/24 |
|---|---|---|
| 6,373,016 B2 | 4/2002 | Pellegrin |

(Continued)

FOREIGN PATENT DOCUMENTS

| CN | 101246794 A | 8/2008 |
|---|---|---|
| DE | 102007012442 A1 | 2/2008 |

(Continued)

OTHER PUBLICATIONS

PCT International Search Report mailed Dec. 10, 2012 corresponding to PCT International Application No. PCT/US2012/026725 filed Feb. 27, 2012 (12 pages).

*Primary Examiner* — Ramon M Barrera

(57) ABSTRACT

A slot motor apparatus for a circuit breaker is disclosed. The slot motor has first and second legs connected by a thin web, and an extending portion extending rearward from the rear faces of the legs. Slot motor-arc plate assemblies having an arc plate assembly received at least partially overtop of the extending portion are also disclosed, as are assemblies having the arc plate assembly received very close to the rear faces of the slot motor legs. Circuit breakers, slot motor-arc plate assemblies, slot motor covers, and methods of operating the slot motor-arc plate assemblies are disclosed, as are other aspects.

22 Claims, 8 Drawing Sheets

(51) Int. Cl.
    *H01H 77/10*    (2006.01)
    *H02K 33/00*    (2006.01)
    *H01H 9/36*     (2006.01)
    *H01H 9/34*     (2006.01)

(52) U.S. Cl.
    CPC .............. *H01H 9/346* (2013.01); *H01H 9/362* (2013.01); *H01H 9/446* (2013.01); *H01H 2003/268* (2013.01); *H01H 2009/365* (2013.01)

(58) Field of Classification Search
    USPC ........................................................ 335/201
    See application file for complete search history.

(56) References Cited

U.S. PATENT DOCUMENTS

| | | |
|---|---|---|
| 6,831,536 B1 | 12/2004 | Zindler |
| 7,863,537 B2 | 1/2011 | Brand |
| 2001/0027961 A1 | 10/2001 | Pellegrin |
| 2008/0191819 A1 | 8/2008 | Eberts |
| 2009/0090698 A1 | 4/2009 | Brand |
| 2009/0321233 A1* | 12/2009 | Ferree .................. H01H 77/107 200/244 |
| 2011/0174781 A1 | 7/2011 | Beatty, Jr. |

FOREIGN PATENT DOCUMENTS

| | | |
|---|---|---|
| EP | 0505194 A1 | 9/1992 |
| EP | 1906430 A1 | 4/2008 |
| WO | 2007116311 A1 | 10/2007 |

\* cited by examiner

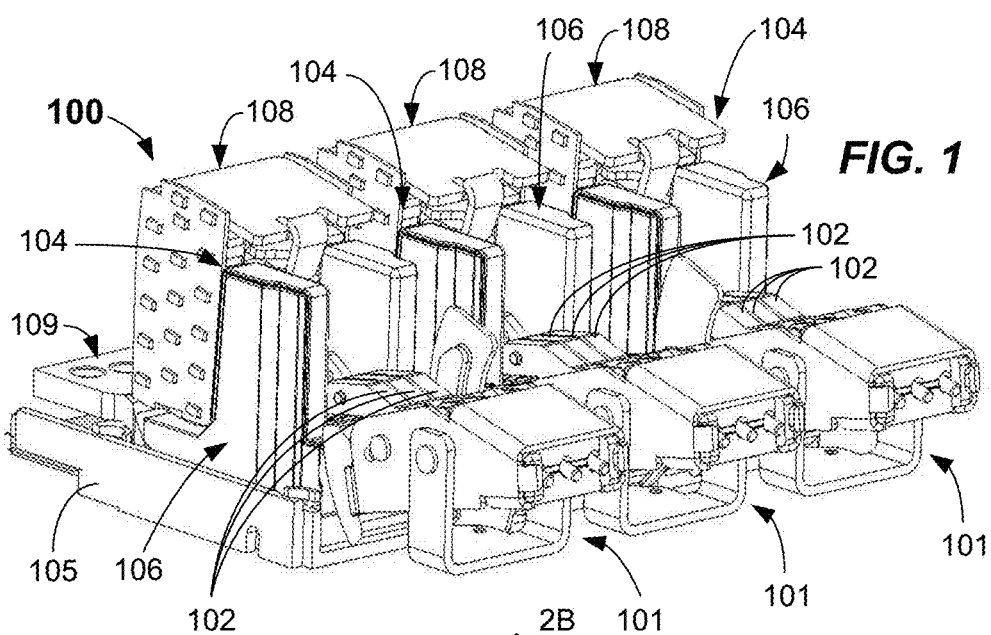
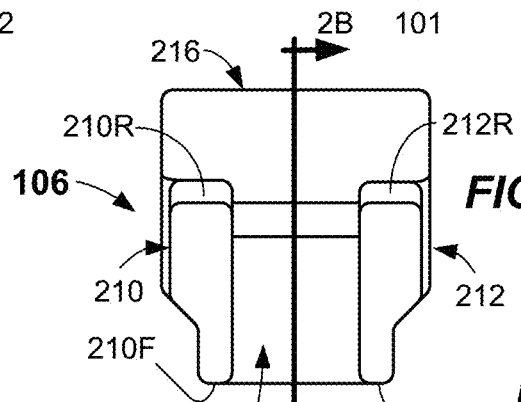
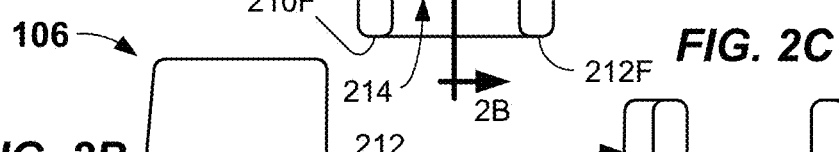
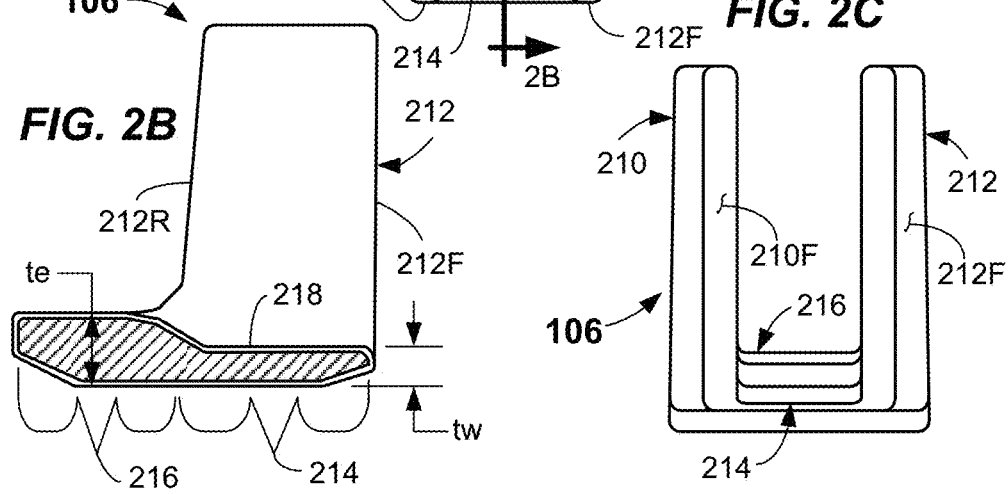

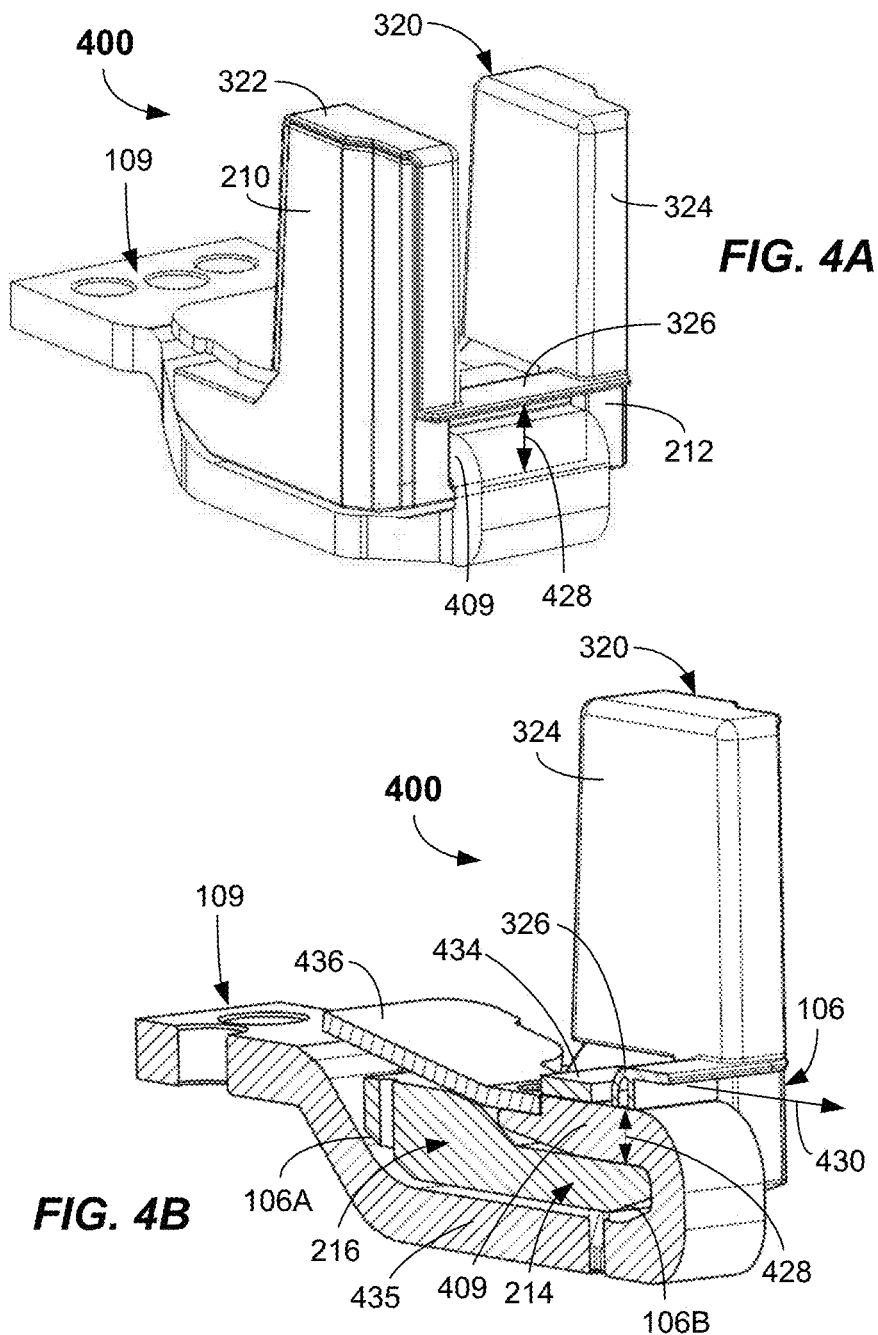

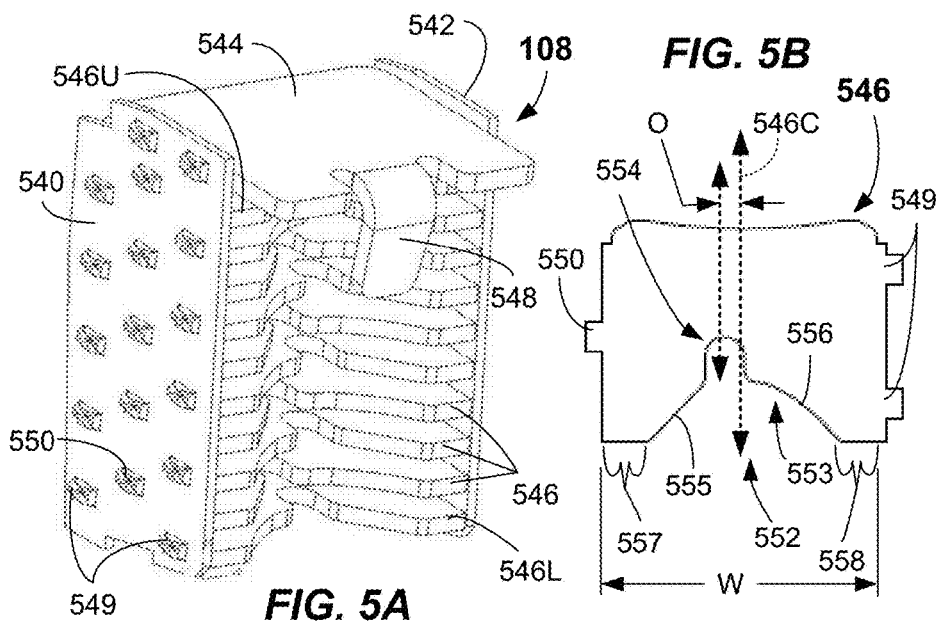
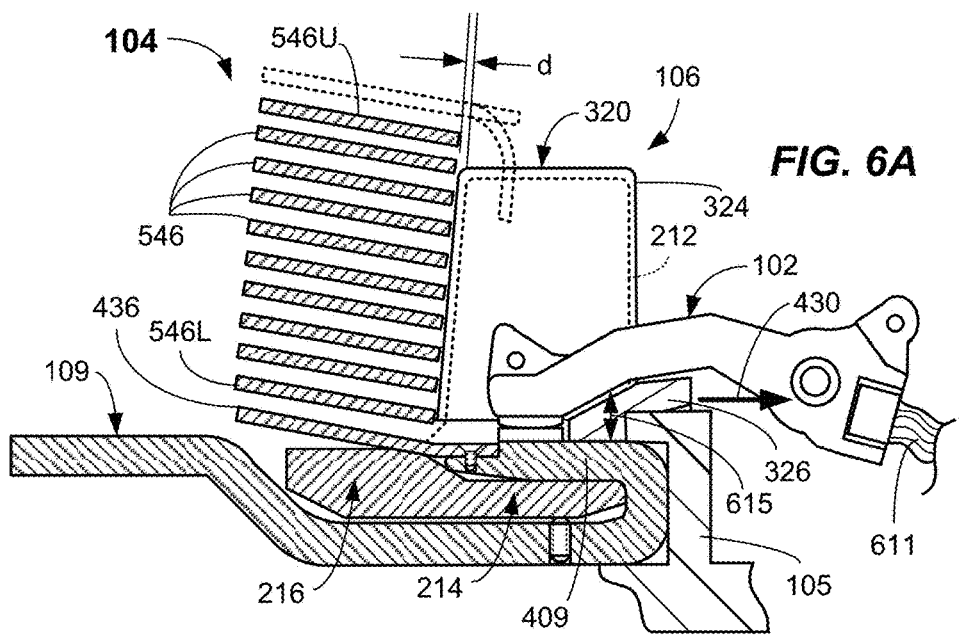

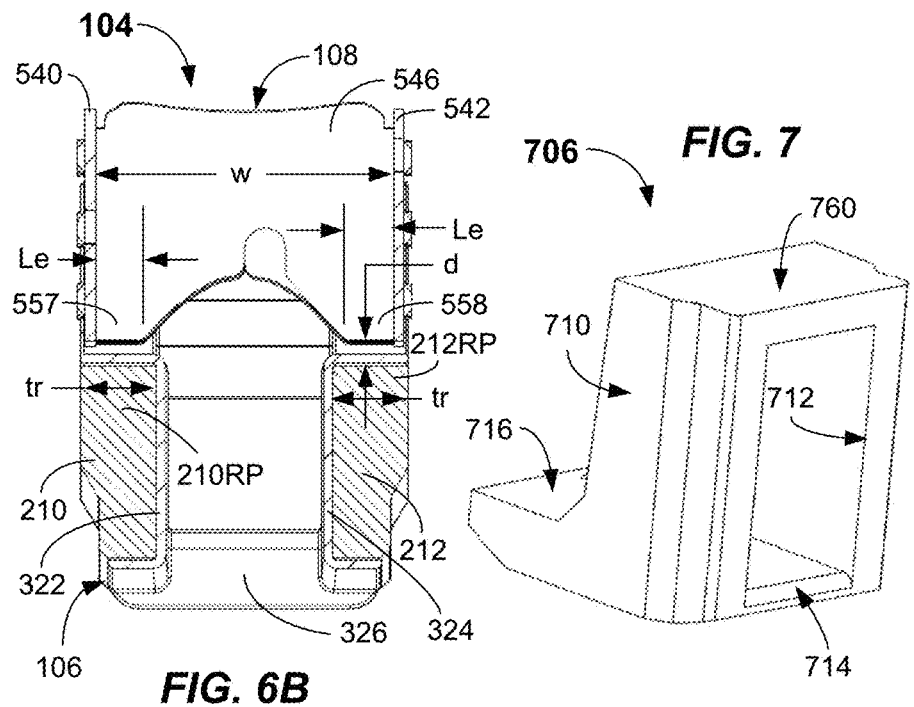
FIG. 6B
FIG. 7
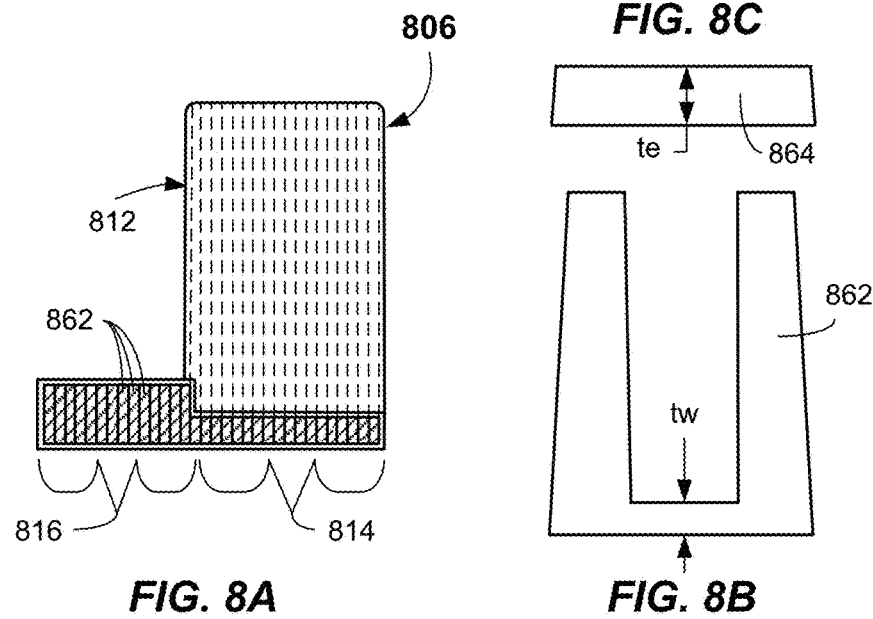
FIG. 8A
FIG. 8B
FIG. 8C

SLOT MOTOR, SLOT MOTOR COVER, SLOT MOTOR—ARC PLATE ASSEMBLY, AND METHODS OF OPERATION

FIELD

The present invention relates generally to circuit breakers, and more particularly to slot motors adapted to be used in circuit breakers.

BACKGROUND

Circuit breakers can include electrical contact assemblies having multiple contact arms per phase. The contact arms are intended to blow apart from the stationary electrical contact due to magnetic repulsion forces generated under very high short circuit conditions. It is desirable that such circuit breakers interrupt as quickly as possible in order to limit damage to the protected electrical equipment. Slot motors have been used to increase interruption speed. Currently, not only is there a demand to decrease the relative size of existing circuit breakers, but also to further improve interruption speed.

Thus, improved slot motor apparatus adapted to be used in circuit breakers are sought.

SUMMARY

In a first embodiment, a slot motor apparatus is provided. The slot motor apparatus includes a first leg, a second leg spaced from the first leg, wherein each of the first leg and the second leg has a front face and a rear face, a web connected between the first leg and the second leg, and an extending portion that extends rearward from the rear faces.

In another embodiment, a slot motor cover apparatus is provided. The slot motor cover apparatus includes a first cover portion configured and adapted to cover at least a portion of a first leg of a slot motor, a second cover portion configured and adapted to cover at least a portion of a second leg of a slot motor, and a blocking portion configured and adapted to be received between a contact arm and a line terminal.

In yet another apparatus embodiment, a slot motor-arc plate assembly is provided. The slot motor-arc plate assembly includes a slot motor apparatus having a first leg, a second leg spaced from the first leg, wherein each of the first leg and the second leg has a front face and a rear face, a web connected between the first leg and the second leg, and an extending portion that extends rearward from the front faces, and an arc plate assembly provided proximate to the rear faces of the first and second legs and received proximate the extending portion.

In yet another apparatus embodiment, a circuit breaker is provided. The circuit breaker includes a slot motor apparatus having a first leg, a second leg spaced from the first leg, wherein each of the first leg and the second leg has a front face and a rear face, a web connected between the first leg and the second leg, and an extending portion that extends rearward from the rear faces, and an arc plate assembly provided proximate to the rear faces of the first leg and second leg and received proximate the extending portion, the arc plate assembly having first and second side plates, and a plurality of arc splitter plates extending between the first and second side plates.

In a method embodiment, a method of operating a slot motor-arc plate assembly is provided. The method includes providing a providing a slot motor apparatus having a first leg, a second leg spaced from the first leg, wherein each of the first leg and the second leg have a front face and a rear face, a web connected between the first leg and the second leg, and an extending portion that extends rearward from the rear faces, providing an arc plate assembly located proximate to the rear faces of the first and second legs and located proximate the extending portion, the arc plate assembly having first and second side plates, and a plurality of arc splitter plates extending between the first and second side plates, and causing a magnetic flux to be carried in at least the arc splitter plates and the extending portion.

Still other aspects, features, and advantages of the present invention may be readily apparent from the following detailed description by illustrating a number of example embodiments and implementations, including the best mode contemplated for carrying out the present invention. The present invention may also be capable of other and different embodiments, and its several details may be modified in various respects, all without departing from the scope of the present invention. Accordingly, the drawings and descriptions are to be regarded as illustrative in nature, and not as restrictive. The invention is to cover all modifications, equivalents, and alternatives falling within the scope of the invention.

DESCRIPTION OF DRAWINGS

FIG. 1 illustrates an isometric view of a circuit breaker electrical contact assembly including a slot motor apparatus according to embodiments.

FIG. 2A illustrates a top plan view of a slot motor apparatus according to embodiments.

FIG. 2B illustrates a cross-sectioned side view of the slot motor apparatus of FIG. 2A, along section line 2B-2B.

FIG. 2C illustrates a front side plan view of a slot motor apparatus according to embodiments.

FIG. 4A illustrates an isometric view of a slot motor-line terminal assembly according to embodiments.

FIG. 4B illustrates an isometric cross-sectioned view of a slot motor-line terminal assembly taken through a vertical center of FIG. 4A according to embodiments.

FIG. 5A illustrates an isometric view of an arc plate assembly according to embodiments.

FIG. 5B illustrates a top plan view of an arc splitter plate according to embodiments.

FIG. 6A illustrates a partially cross-sectioned side view of a slot motor-arc plate assembly according to embodiments.

FIG. 6B illustrates a top plan view of an arc plate assembly according to embodiments.

FIG. 7 illustrates an isometric view of an alternative embodiment of a slot motor apparatus.

FIG. 8A illustrates a partially cross-sectioned side view of an alternative embodiment of a slot motor apparatus taken through a vertical center of the slot motor apparatus.

FIG. 8B illustrates a front plan view of a U-plate from a laminated alternative embodiment of a slot motor apparatus of FIG. 8A.

FIG. 8C illustrates a front plan view of another plate from an extending portion of a laminated alternative embodiment of a slot motor apparatus of FIG. 8A.

DESCRIPTION

Figures 2D, 2E:
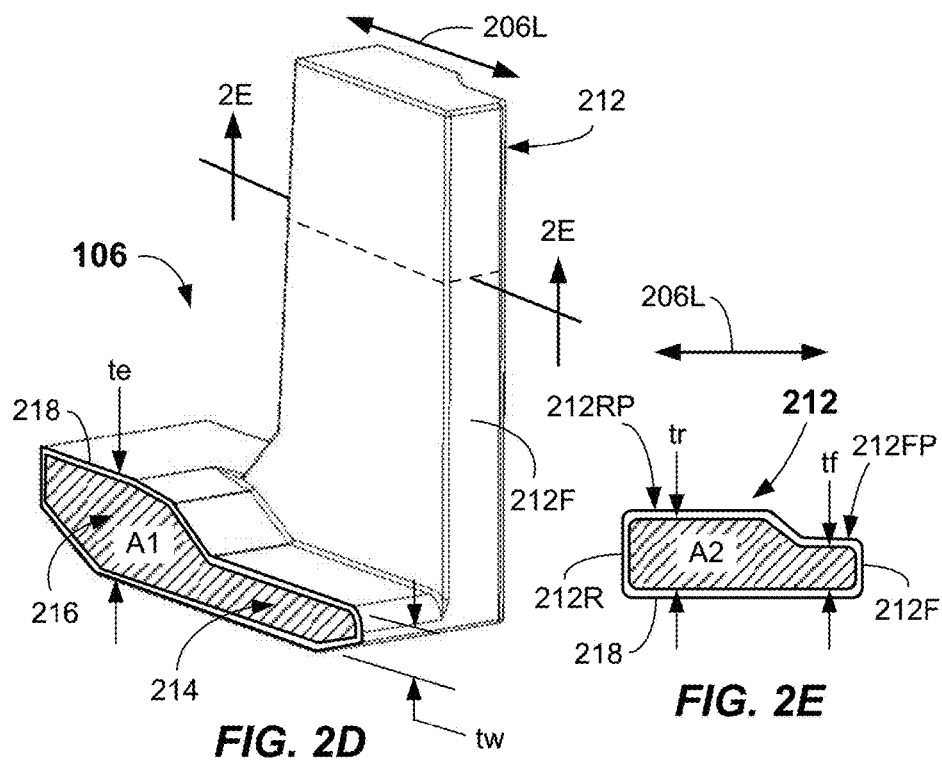
FIG. 2D illustrates a partially cross-sectioned isometric view of a slot motor apparatus.
FIG. 2E illustrates a cross-sectioned upward view taken through a second slot motor leg.

Embodiments of a slot motor apparatus and a slot motor-arc plate assembly are useful in circuit breakers, such as in low voltage molded case circuit breakers. The slot motor apparatus and a slot motor-arc plate assembly are especially useful in circuit breakers having a current rating between 160 A-1000 A, for example. However, the slot motor apparatus and slot motor-arc plate assemblies described herein may be used in any suitable circuit breaker or switch. Embodiments of the slot motor apparatus and slot motor-arc plate assembly are especially adapted for use in circuit breakers containing one or more contact assemblies having multiple contact arms that are intended to blow apart from a stationary contact due to magnetic repulsion under very high short circuit conditions. It is desirable that such circuit breakers have electrical contact arms that blow apart extremely rapidly when exposed to such short circuit conditions. To accomplish this, an inventive configuration of a slot motor apparatus and slot motor-arc plate assembly are provided. Space within the circuit breaker is very limited, and smaller and smaller configurations are sought after within the industry.

In view of the foregoing difficulties, improved slot motor apparatus and slot motor-arc plate assemblies are provided. The slot motor apparatus includes a first leg and a second leg spaced from the first leg, wherein each of the first and second legs has a front face and a rear face, a web connected between the first and second legs, and an extending portion that extends in a rearward direction from the rear faces. The web interconnecting the legs may be made relatively thin thereby allowing a position of the electrical contacts to be lowered in the assembly and lowering an overall profile height of the circuit breaker, and/or allowing more room for handle components and the like.

As will become apparent, the slot motor apparatus and slot motor-arc plate assembly may advantageously allow the circuit breaker into which they are received to interrupt an experienced short circuit condition very rapidly. Moreover, the slot motor apparatus may advantageously allow the circuit breaker into which it is received to be made physically smaller. Furthermore, according to one or more embodiments, improved insulation may be provided to minimize or eliminate internal phase-to-phase, phase-to-ground strikes, and/or other electrical shorts.

These and other embodiments of the slot motor apparatus, slot motor cover apparatus, slot motor-arc plate assemblies, circuit breakers including the slot motor-arc plate assemblies, and methods of operating the slot motor-arc plate assemblies are described below with reference to FIGS. 1-10. The drawings are not necessarily drawn to scale. Like numerals are used throughout to denote like elements.

Referring now in specific detail to FIG. 1, a slot motor-arc plate subassembly 100 is shown. The slot motor-arc plate subassembly 100 may be used in single pole circuit breaker or a multi-pole circuit breaker having one or more electrical contact apparatus 101 that may be installed within a housing of a circuit breaker.

For example, the circuit breaker may comprise multiple individual electrical contact apparatus 101, corresponding to three or more electrical phases with the circuit breaker provided for each electrical phase. Circuit breakers may include one or more slot motor-arc plate subassemblies 100 as described herein, and a contact apparatus 101 may be designated for each phase. For example, each slot motor-arc plate subassembly 100 can be oriented in a side-by side configuration and receive one or more contact arms 102 of the electrical contact apparatus 101 therein. In the depicted embodiment, the electrical contact apparatus 101 may be identical to one another, and each one may be adapted to receive a single phase provided from a polyphase electrical power distribution system (not shown). Components for a three-phase circuit breaker are shown, but various embodiments are equally adapted for use with four-phase systems, or the like. The contact apparatus 101 are described in WO 2011/097612 entitled "Circuit breaker Contact Assembly, And Systems and Methods Using Same," the disclosure of which is hereby incorporated by reference herein in its entirety.

The depicted slot motor-arc plate subassembly 100 includes three or more slot motor-arc plate assemblies 104. Each slot motor-arc plate assembly 104 includes a slot motor apparatus 106 and an arc plate assembly 108. The slot motor-arc plate assembly 104 may be received in a housing subcomponent 105. The housing subcomponent 105 may be part or and coupled to the rest of a multi-piece housing. The slot motor apparatus 106 and slot motor-arc plate assembly 104 functions to intensify a magnetic field crossing through the one or more contact arms 102 during a short circuit event. This increases the magnetic repulsion force on the arms 102, so that the one or more contact arms 102 blow open more quickly. By quickly lengthening a distance between the moving and stationary electrical contacts, a rapid increase in an opposing arc voltage is caused, which tends to more rapidly extinguish the arc. Furthermore, the slot motor apparatus 106 and slot motor-arc plate assembly 104 functions to intensify a magnetic field crossing through the electric arc. This increases the magnetic arc forces tending to drive the arc into the arc splitter plates of the arc plate assembly 108 more rapidly. Effectively, the arc may be more quickly driven into the spaces between the arc splitter plates. This may also increase the opposing arc voltage more rapidly, because of the effects of anode/cathode fall and cooling of the gases which reduces conductivity. The slot motor-arc plate assembly 104, in one advantage, may enable increasing a level of magnetic flux, therefore increasing interruption performance. Optionally, performance may be maintained while making a size of the device more compact. A secondary advantage of one or more embodiments may be that there can be fewer parts to maintain in the manufacturing environment and costs may be lowered.

Figure 9A:
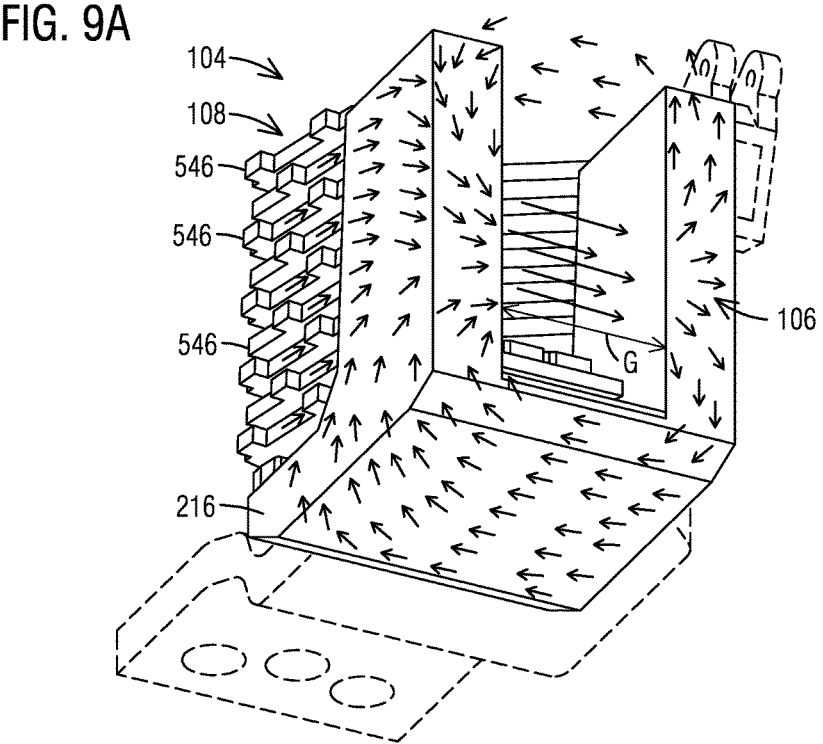
FIGS. 9A-9B illustrates isometric views of a slot motor-arc plate assembly including magnetic flux lines.
Figure 9B:
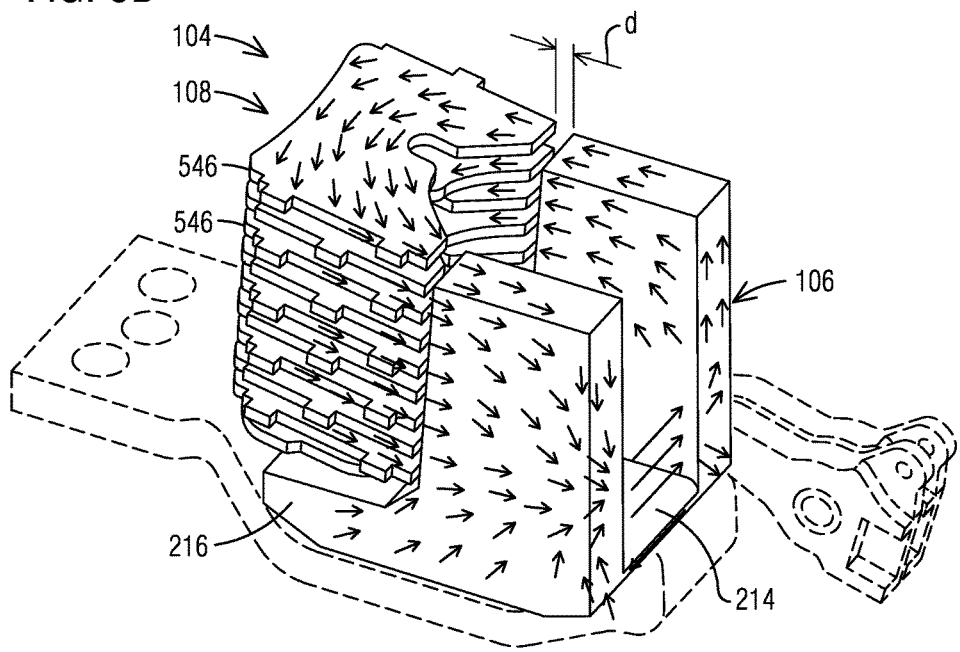

The slot motor apparatus 106, as best shown in FIGS. 2A-2G, includes a first leg 210, a second leg 212 spaced from the first leg 210, wherein each of the first leg 210 and the second leg 212 has a front face 210F, 212F, and a rear face 210R, 212R, a web 214 connected and extending between the first leg 210 and the second leg 212, and an extending portion 216 that extends in a rearward longitudinal direction from the rear faces 212R, 212R, such as near a bottom thereof. The extending portion 216 extends in the rearward longitudinal direction beyond the rear faces 212R, 212R. In the depicted embodiment, the slot motor apparatus 106 comprises a thickness (te) of the extending portion 216 that is greater than a thickness (tw) of the web 214. As will be apparent, the extending portion 216 may be received proximate to the arc plate assembly 108. In particular, the extending portion 216 may be at least partially received underneath of the arc plate assembly 108 (See FIGS. 1 and 6A). The web 214 may be received between primary and opposing portions of the line terminal 109 (Only one line terminal 109 viewable in FIG. 1). In one or more embodiments, each of the first leg 210, second leg 212, web 214, and extending portion 216 may comprise single-piece construction, as opposed to a laminated construction. Extending portion thickness (te) may be between about 10 mm and about 5 mm, and web thickness (tw) may be between about 5 mm and about 8 mm. Moreover, as can be seen in FIGS. 9A and 9B, addition of the extending portion 216 provides additional material in which the magnetic field may travel. This allows the web 214 to be made thinner so that the overall height of the circuit breaker can be reduced.

A performance comparison that modeled the effect of making the web thickness (tw) is shown in Table 1. Model 1 is a thicker web version with the web and legs being of comparable dimension, whereas Model 2 is an embodiment as described herein with the thinner web 214 and the extending portion 216. This computer model illustrated that the web 214 may be made thinner, and, thus, the circuit breaker may be made less tall, with comparable contact arm torque and arc force performance.

TABLE 1

| Performance comparison | | |
|---|---|---|
| Model | Contact Arm Torque [N-m] | Arc Force [N] |
| 1 | 51.57 | 188.71 |
| 2 | 48.50 | 189.76 |

Each of the first leg 210, second leg 212, web 214, and extending portion 216 may comprise a coating layer 218, such as an epoxy coating layer. The coating layer 218 may be a powder coated epoxy applied by a powder coating process. The epoxy coating layer 218 may have a generally-uniform nominal layer thickness of less than about 2 mm, or even less than about 1 mm, and in some embodiments between about 0.2 mm and about 2 mm, or even between about 0.2 mm and about 1 mm, or even between about 0.2 mm and about 0.5 mm in some embodiments. Other thicknesses and other coating formulations and types may be used. Use of a coating layer 218 (e.g., an epoxy coating) in conjunction with a slot motor cover (See slot motor cover 320 in FIG. 3A-3C) may allow the size and/or clearances between various components to be reduced. Furthermore, the coating layer 218 may minimize any conduction of the arc formed upon electrical contact separation into the slot motor 106, and may minimize shorting with portions of the line conductor 109.

Additionally or alternatively, the first leg 210, second leg 212, web 214, and extending portion 216 may comprise a powdered metal material. The powdered metal material may be a powdered iron, such as F-0000-10, -15, or -20 powdered iron per MPIF Standard 35. The density of the powdered metal material may be between about 6.0 g/cm$^3$ and about 7.5 g/cm$^3$. Other densities and types of powdered metal including powdered metal alloys may be used. The slot motor 106 comprising a powdered metal may be formed by a conventional pressing and sintering process.

Each of the legs 210, 212 may include a slight taper (e.g., draft angle) in each dimension from bottom to top. In particular, the legs 210, 212 may be made narrower at distances further away from the web 214. This is because it is believed to be non-critical to have high blow-apart force on the one or more contact arms 102 after the one or more contact arms 102 are sufficiently separated from the stationary electrical contact. The use of powdered metal is also thought to reduce the conductivity of the slot motor 106, which may advantageously cause the slot motor 106 to carry less eddy currents.

Referring now to FIG. 2E, it can be seen that the second leg 212 may comprise a non-uniform transverse thickness. In particular, the slot motor 106 may include a horizontal cross-sectional shape that varies along a longitudinal direction 206L aligned with the front face 212F and the rear face 212R. In more detail, a thickness dimension of the non-uniform transverse thickness of the leg 212 may comprise a thickness (tr) of a rear portion 212RP adjacent to the rear face 212R that is of a relatively greater thickness than a thickness (tf) of a front portion 212FP adjacent to the front face 212F. The first leg 210 may be a mirror image of the second leg 212, and, thus, may also have non-uniform transverse thickness. The thickness of the slot motor apparatus 106 may be made relative thinner at portions (e.g., front portion 212FP) in this manner, and may allow fasteners to be installed in the circuit breaker in this position without widening an overall width of the circuit breaker. In general, the magnetic flux is lower in this region, so making the legs 210, 212 in this region thinner does not represent a significant design compromise.

As shown in FIG. 2D, the slot motor 106 center portion may include a vertical cross-sectional shape that varies along the longitudinal direction 206L. The thickness (tw) of the web 214 may be made relatively thin in vertical thickness, so that the line terminal 109 may be bent over itself in a relatively tight radius. This allows the height of the slot motor-terminal assembly 400 (FIGS. 4a-4b) to be reduced. In one or more embodiments, the thickness (tw) of the web 214 may be less than a thickness (tr) of the rear portions 210RP, 212RP of the legs 210, 212. Any magnetic flux carrying capacity that is lost due to making the web 214 relatively thinner is regained by providing a relatively larger thickness (te) of the extending portion 216. Moreover, as will be apparent, projecting the extending portion 216 at least partially underneath of the arc plate assembly 108 and moving the arc plate assembly 108 very close to the rear faces 210R, 212R of the slot motor 106 allows the slot motor apparatus 106 and the arc plate assembly 108 to cooperate and carry a greater flux density.

In another feature, the cross-sectional area (A1) of the combined metal portions of web 214 and extending portion 216 may be greater than a cross-sectional area (A2) of the metal portions of either of the first or second legs 210, 212. For example, the ratio of A1 and A2 may be as provided in Eqn. 1:

$$A1 \geq C*A2 \qquad \text{Eqn. 1}$$

wherein C is a constant greater than about 1.5, or even greater than about 1.6, or even greater than about 1.7 in some embodiments.

As shown in FIGS. 3A-3D and 4A-4B, the slot motor apparatus 106 may include a slot motor cover 320 that may be assembled as part of a slot motor-line terminal assembly 400. The slot motor cover 320 provides insulation over the legs 210, 212 and may include a first cover portion 322 configured and adapted to cover at least a portion of the first leg 210, and a second cover portion 324 configured and adapted to cover at least a portion of the second leg 212. The slot motor cover 320 may include a blocking portion 326 configured to be spaced from the web 214 to form a gap 428 between the web 214 and the blocking portion 326 when installed on the legs 210, 212. The gap 428 may be configured and adapted to allow an opposed portion 409 (e.g., opposing the primary portion 435 provided under the web 214) of the line terminal 109 to be received between the blocking portion 326 and the web 214 as best shown in FIG. 4B. The gap 428 may be between about 7 mm and 9 mm. Other gap dimensions may be used. The slot motor cover 320 functions as an insulating surface and may minimize arc conduction to the first and second legs 210, 212 of the slot motor 106. Furthermore, the slot motor cover 320 covers the rear faces that are provided adjacent to the arc plate assembly 104. The slot motor cover 320 and components may be manufactured from any suitable plastic or polymer material such as an ablative plastic material. Nylon 6-6 is one suitable material, for example. Nylon 6-6 is made of hexamethylenediamine and adipic acid. Other suitable ablative or outgassing materials may be used. For example, glass- or mineral-filled Nylon or other polymers such as polyamide may be used. As should be recognized, the combination of the slot motor cover 320 with the epoxy coating 218 on the slot motor 106 provides an improved two-part insulation system. Any combination of an insulating layer coating (e.g., epoxy) and ablative cover material may be used.

Figure 3A:
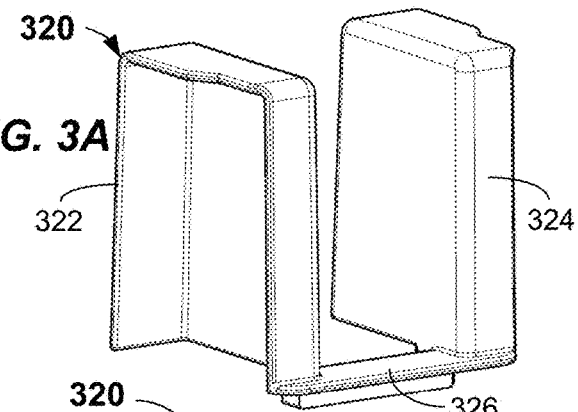
FIGS. 3A and 3B illustrate various isometric views of a slot motor cover apparatus according to embodiments.
Figure 3E:
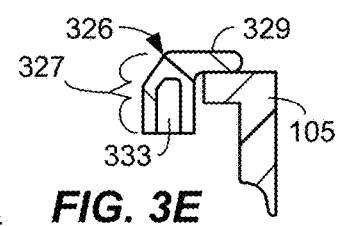
FIG. 3E illustrates a cutout cross-sectioned view through a blocking element and housing portion according to embodiments.
Figure 3B:
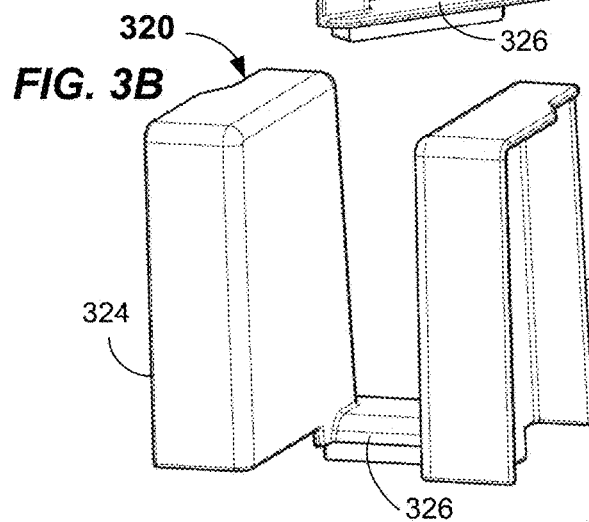
Figure 3F:
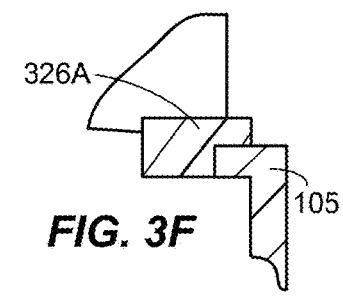
FIGS. 3F and 3G illustrates cutout cross-sectioned views through alternate embodiments of blocking element and housing portions.
Figure 3G:
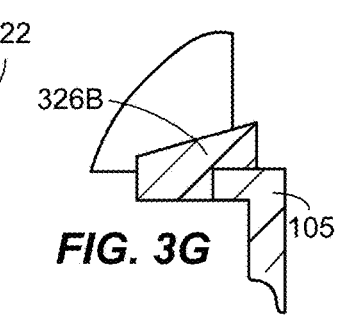
Figure 3C:
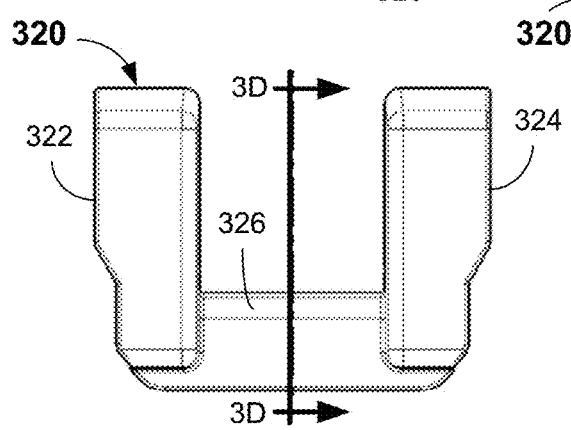
FIG. 3C illustrates a top plan view of a slot motor cover apparatus according to embodiments.
Figure 3D:
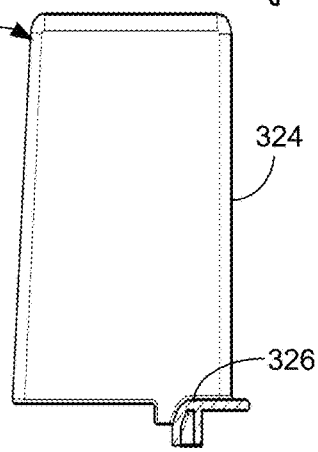
FIG. 3D illustrates a cross-sectioned side view of a slot motor cover apparatus taken along section line 3D-3D of FIG. 3C.

Blocking member 326 may have any suitable cross-sectional shape. For example, the cross-sectional shape may be as shown in FIG. 3E, wherein the blocking member 326 includes an upright traversing portion 327 comprising a blocking face that is configured and adapted to be received between a contact arm 102 and the opposing portion 409 of the line terminal 109 to block the arc and/or arc debris from traveling in a generally forward longitudinal direction 430 (see FIGS. 4B and 6A). The blocking member 326 may also include an engaging portion 329 that may be configured and adapted to engage, or be provided in close proximity to, a housing portion 105 of a circuit breaker housing receiving the slot motor 106 (See also FIG. 1). The blocking member 326 may be solid in cross section or may include a hollow or recessed portion 333. Other cross-sectional shapes of the blocking member 326 may be provided. For example, the blocking member 326A may have a generally rectangular shape, as shown in FIG. 3F. Alternatively, as shown in FIG. 3G, the cross section of the blocking member 326B may have a generally wedge shape to fill as much of the space between the one or more contact arms 102 and the top of the opposing portion 409 as is possible (See FIG. 6A).

The blocking portion 326 may itself be formed as a connecting web and may extend between, and connect to, each of the first cover portion 322 and second cover portion 324, thus forming an integral one-piece cover 320. Optionally, the blocking portion 326 may extend from only one of the cover portions 322, 324 and extend to a location in very close proximity (e.g., within about 1 mm) of the other cover portion, thus laterally filling at least a portion, and in some embodiments, most of the space extending transversely between the respective first and second legs 210, 212.

In another alternate embodiment, the blocking member 326 may be a separate component that connects or attaches to a top of the opposing portion 609 of the line terminal 109, but not to either of the cover portions 322, 324. Attachment of the blocking member 326 to the opposing portion in this embodiment may be by a snap fastener, adhesive, screw, or the like. In all described embodiments, the blocking member 326 may be positioned on a forward side of the stationary electrical contact (see stationary contact 434 of FIG. 4B), and in close proximity thereto.

FIGS. 4A and 4B clearly illustrate the various components of the slot motor-line terminal assembly 400, including the line terminal 109 with opposing portion 409, stationary electrical contact 434 coupled to the opposing portion 409, such as by brazing or the like, the slot motor 106 including the web 214 having a relatively thin thickness received between the opposing portion 409 and the primary portion 435, the extending portion 216, and an arc runner 436 coupled to the opposing portion 409 at an end thereof. Coupling may be by a suitable threaded fastener or the like. In the slot motor-line terminal assembly 400, the slot motor 106 may be coupled to the line terminal 109 by fastener (a set screw or the like) that may force the web 214 against a bottom surface of the opposing portion 409. The slot motor-line terminal assembly 400 may also include a slot motor cover 320 including at least first and second cover portions 320, 324 installed over the legs 210, 212 of the slot motor 106. Blocking member 326 may be included in some embodiments. Cutoff portions 106A, 106B may be provided on the extending portion 216 and web 214 of the slot motor 106 and allow insertion of the slot motor 106 between the primary portion 435 and opposing portion 409 while allowing a very tight bend in the line terminal 109.

FIG. 5A illustrates an example embodiment of an arc plate assembly 108. The arc plate assembly 108 may include side plates 540, 542, top plate 544 and a plurality of arc splitter plates 546 (a few labeled) including lowermost arc plate 546L and uppermost arc splitter plate 546U. The side plates 540, 542 may be a V0 rated fiberglass or other suitable insulating material. Top plate 544 may include an arc horn 548. Each of the arc splitter plates 546, 546L, 546U is preferably identical to one another. The arc splitter plates 546, 546L, 546U may be steel that may be plated with zinc or nickel, for example. The arc splitter plates 546, 546L, 546U may have a thickness of between about 2 mm and 4 mm, and a width between the side plates 540, 542 of less than about 50 mm, for example. Other thicknesses and widths may be used.

Each of the arc splitter plates 546, 546L, 546U may include only two tabs 549 on one lateral end, and only one tab 550 on the other lateral end. The tabs 549, 550 may be received in slots formed in side plates 540, 542. Having only three tabs per arc splitter plate 546 promotes ease and proper assembly. Every other arc splitter plate 546 is flipped over within the arc plate assembly 108. Thus, every other arc splitter plate 546 has only one tab 550 attached at a same side plate 540 or 542. For example, as shown in FIG. 5A, the lower-most arc splitter plate 546L may attach to the side plate 540 with two tabs 549, while only one tab 550 of the lower-most arc splitter plate 546 may attach to the second side plate 542. On the next arc splitter plate 546 above the lower-most arc splitter plate 546L, the arc splitter plate 546 is reversed (e.g., flipped), and only one tab 550 is attached to the side plate 540, while on the other end two tabs are attached to the side plate 542. The attachment may be by crimping to deform a portion of the tabs 549, 550, such as by use of a suitable crimping die or other crimping or deforming means.

As shown in FIG. 5B, each of the arc splitter plates 546, 546L, 546U (a representative arc splitter plate shown) includes a compound recess 552. The compound recess 552 may have a primary recess 553 formed into the front of the arc splitter plate 546, and a smaller secondary recess 554 formed into the primary recess 553. Thus, the arc splitter plates 546, 546L, 546U are provided with two discontinuous shapes. The secondary recess 554 may be slightly offset from a physical center 546C of the arc splitter plate 546 by an offset distance "O." Offset distance "0" may be between about 2 mm and about 5 mm, for example. Other offset distances "0" may be used. The primary recess 553 may itself comprise a compound shape. For example, a first side portion 555 on a first side of the secondary recess 554 may be different shape that the second side portion 556. For example, the first side portion 555 may be a straight line, and the second side portion 556 may be a radius. Other compound shapes may be used.

On either front side of the arc splitter plates 546, 546L, 546U, magnetic flux conducting portions 557, 558 may be provided. FIG. 6B illustrates the respective orientations of the magnetic flux conducting portions 557, 558 relative to the first and second legs 210, 212 of the slot motor 106. The magnetic flux conducting portions 557, 558 are end portions of the arc splitter plates 546, 546L, 546U that are positioned adjacent to the respective legs 210, 212, and in very close proximity thereto. The magnetic flux conducting portions 557, 558 are large enough and positioned close enough to ensure good magnetic flux travel into the arc splitter plates 546, 546L, 546U from the legs 210, 212 of the slot motor 106. For example, the magnetic flux conducting portions 557, 558 may have a length (Le) that is at least 10% or more than a width (W) of the arc splitter plates 546, 546L, 546U between the side plates 540, 542. The magnetic flux conducting portions 557, 558 may comprise plate portions having a length (Le) of between about 5 mm and 10 mm, for example. Other values may be used. In another feature, the magnetic flux conducting portions 557, 558 may have a length (Le) that is at least 50% or more, or even 60% or more than the thickness (tr) of the rear portion 212RP of the second leg 212, and may have a length (Le) that is at least 50% or more, or even 60% or more than a thickness (tr) of a rear portion 210RP of the first leg 210.

FIG. 6A illustrates a slot motor-arc plate assembly 104 according to a further embodiment, and shows the relatively proximity of the various components. In particular, the blocking portion 326 may be received in, and at least partially fill, a space 615 located between the top of the opposing portion 409 of the line terminal 109 and a bottom portion of the one or more contact arms 102. The blocking portion 326 may function to block the arc and/or arcing debris from progressing in the forward longitudinal direction 430 towards the various moving components of the electrical contact apparatus 101 (e.g., springs, pivot pins or the like). Furthermore, as described above, the blocking member 326 may interface with the housing portion 105 to minimize arcing between the contact arm 102 and the line terminal 109.

As further shown in FIG. 6A, the one or more contact arms 102 may be flexibly and electrically interconnected to a respective load terminal (not shown) via one or more flexible electrical conductors 611 (a portion shown). In some embodiments, the flexible conductor 611 may be one or more braided or laminated conductive metal lines. A flexible conductor 611 may be connected to each of the contact arms 102, such as by braising, welding, soldering, or the like. Other means for connection may be employed. The other components of the circuit breaker are not shown and may be of conventional construction or as shown in WO 2011/097612 entitled "Circuit breaker Contact Assembly, And Systems and Methods Using Same."

Figures 2F, 2G:
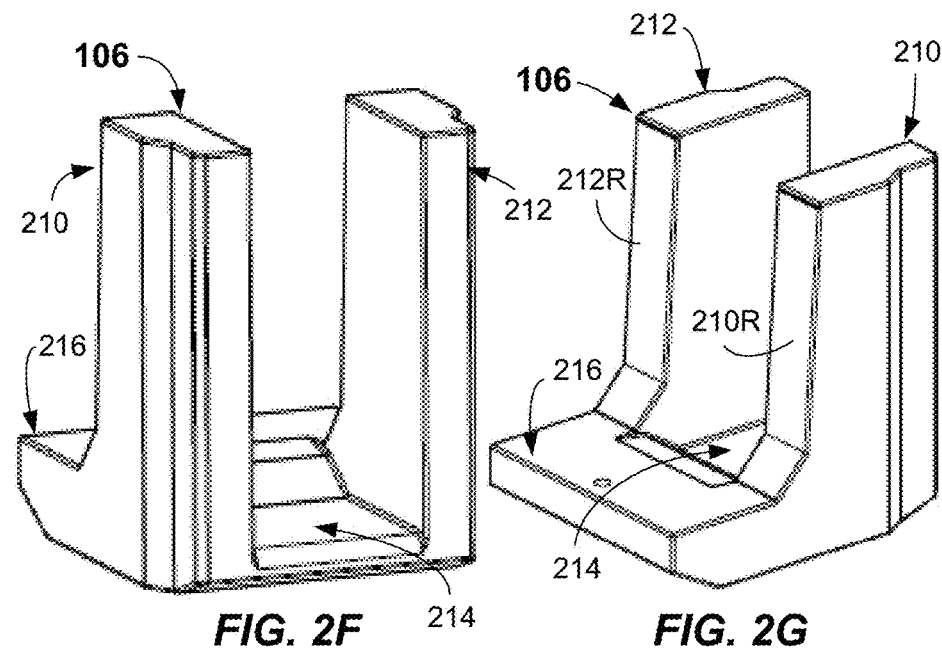
FIGS. 2F and 2G illustrate various isometric views of a slot motor apparatus according to embodiments.

FIGS. 7 and 8A-8C illustrate several alternative embodiments of slot motor apparatus 706, 806. FIG. 7 illustrates a slot motor apparatus 706 having the same components as shown in the embodiment of FIGS. 2F-2G, namely a first leg 710, a second leg 712, a web 714, and a rearward extending portion 716 that may be generally thicker that the web 714, and an additional component, which is a bridge 760 that connects the first leg 710 and a second leg 712 at a top opposite the web 714. Accordingly, an o-shaped magnetic flux path is achieved. The slot motor apparatus 706 may be manufactured from a powdered metal material and may be coated, such as with a suitable insulating coating (e.g., an epoxy coating), as were previously described.

FIGS. 8A-8C illustrate a slot motor apparatus 806 also having the same components as the FIGS. 2F-2G embodiment, namely a first leg (not shown, but being a mirror image of a second leg 812), the second leg 812, an interconnecting thin web 814, and a rearward extending portion 816. In this embodiment, the body is constructed from plurality of laminated plates. A first set of plates 862 may have a U-shaped configuration as shown in FIG. 8B, and have a configuration that may make up the first leg 810, the second leg 812, and the web 814. The leg portions of the plates may include a taper and may progress from thicker at the bottom to thinner at the top, as shown. A second set of plates 864, as shown in FIG. 8C, may have a rhombus-shaped configuration and make up the extending portion 816. The plates 862 and 864 may be attached together using an adhesive (e.g., epoxy) or mechanical fasteners. Other suitable adhesives may be used. The slot motor apparatus 806 may be coated, such as with a suitable insulating coating (e.g., an epoxy coating) as was previously described. Furthermore, as previously described, thickness (te) of the extending portion 816 may be greater than a thickness (tw) of the web 814 connecting the legs.

FIGS. 6A, 6B, 9A and 9b illustrates the relatively close proximity of the components and the magnetic flux lines in a slot motor-arc plate assembly 104 during contact separation. In operation, when a tripping event occurs, such as due to a current over the rated current of the phase, rapid rotation of the one or more contact arms 102 occurs due to magnetic repulsion forces. The inclusion of a slot motor 106 causes the contact arms 102 to rapidly rotate and move from a closed (ON) configuration (FIG. 6A) to a blown-open configuration. In accordance with one or more embodiments, during electrical contact separation, improved magnetic repulsion forces are generated within the slot motor-arc plate assembly 104. In particular, a distance (d) (see also FIGS. 6A-6B) between the rear faces 210R, 212R (FIG. 2G) of the first and second legs 210, 212 and the front edges of at least some of the arc splitter plates 546 may be minimized, while leaving only enough space to provide adequate insulation there between, i.e., they are positioned exceedingly close to one another. The insulation may be provided by a combination of coating 218 and slot motor cover 320.

The distance (d) is measured between the rear faces 210R, 212R of the first and second legs 210, 212 and the magnetic flux conducting portions 557, 558 of the arc splitter plates 546, 546L, 546U (See FIG. 6B). For example, the dimension (d) may only be large enough to allow insertion of the first and second cover portions 322, 324 of the cover 320 between the respective rear faces 210R, 212R (FIG. 2E) of the first and second legs 210, 212 and the front edges of the arc splitter plates 546, 546L, 546U. The cover thickness may be less than about 2 mm, for example. If coated, the dimension (d) is to the metal portion of the legs 210, 212 of the slot motor 106.

At least some of the plurality of arc splitter plates 546, 546L, 546U may be positioned at less than a distance (d) from the rear faces 210R, 212R. The distance (d) is between the rear faces 210R, 212R of the legs 210, 212 and the magnetic flux conducting portions 557, 558 of the arc splitter plates 546, 546L, 546U. The distance (d) may be about may be about 4 mm or less, about 3 mm or less, about 2.5 mm or less, or even about 2.0 mm or less in some embodiments, for example.

In some embodiments, a majority of the arc splitter plates 546, 546L, 546U are positioned at a distance (d) of about 4 mm or less, about 3 mm or less, about 2.5 mm or less, or even about 2.0 mm or less in some embodiments, as discussed above. For example, 50% or more of the arc splitter plates 546, 546L, 546U may be spaced at the distance (d) being about 4 mm or less, about 3 mm or less, about 2.5 mm or less, or about 2.0 mm or less. In other embodiments, greater than about 60%, greater than about 70%, or even greater than about 80% of the arc splitter plates 546, 546L, 546U may be spaced at a distance (d) being about 4 mm or less, about 3 mm or less, about 2.5 mm or less, or even about 2.0 mm or less. The closer the arc splitter plates 546, 546L, 546U are positioned to the legs 210, 212, the more effective the magnetic flux conduction into the arc splitter plates 546, 546L, 546U will be.

As shown in FIGS. 9A and 9B, because the ends of at least some, or in some embodiments, a majority of the arc splitter plates 546 are positioned in such close proximity to the legs 210, 212 of the slot motor 106, the arc splitter plates 546 of the arc plate assembly 108 themselves provide a return path for the magnetic flux, as indicates by the numerous model arrows on the arc splitter plates 546. As discussed above, providing at least some of the plurality of arc splitter plates 546 within about 4 mm or less from the rear faces 210R, 212R of the first leg 210 and the second leg 212 increases the return path for the magnetic field. This is in addition to the return path provided by the web 214 of the U-shape of the slot motor 106 and the extending portion 216. Thus, it should be recognized that the addition of the extending portion 216 further reduces the overall reluctance of the magnetic circuit.

Because the overall reluctance of the magnetic circuit is reduced by carrying flux in at least some of the arc splitter plates 546 and extending portion 216, the amount of flux crossing through the slot motor air gap "G" is increased (See FIG. 9A). Some of this flux crosses through the current in the contact arm 102 itself, which generates improved Lorentz force, which drives the one or more involved contact arms 102 toward the open position. Because the intensity of the flux is increased, the Lorentz force is also increased. The increased flux density also exists as the one or more contact arms 102 begin to open. Therefore, this feature improves arc force, further driving the electrical arc into the arc splitter plates 546, 546L, 546U.

Figure 10:
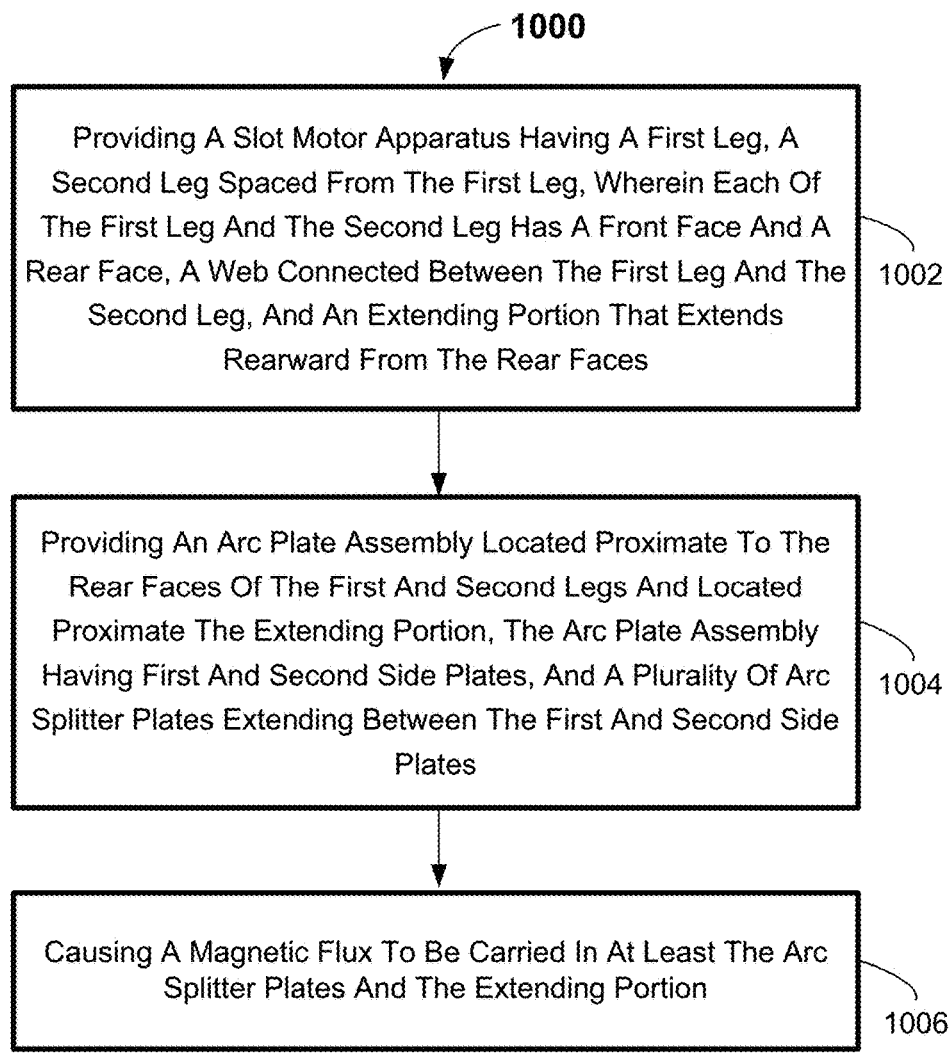
FIG. 10 is a flowchart illustrating a method of operating a slot motor-arc plate assembly according to embodiments.

FIG. 10 is a flowchart that illustrates a method of operating a slot motor-arc plate assembly (e.g., slot motor-arc plate assembly 104) according to embodiments. The method 1000 includes, in 1002, providing a slot motor apparatus (e.g., slot motor apparatus 106) having a first leg (e.g., first leg 210), a second leg (e.g., first leg 212) spaced from the first leg, wherein each of the first leg and the second leg each has a front face (e.g., first leg front face 210F, second leg front face 212F), and a rear face (e.g., first leg rear face 210R; second leg rear face 212R), a web (e.g., web 214) connected between the first leg and the second leg, and an extending portion (e.g., extending portion 216) that extends in a rearward direction from the rear faces. The method 1000 includes, in 1004, providing an arc plate assembly (e.g., arc plate assembly 108), located proximate to the rear faces of the first and second legs and located proximate the extending portion, the arc plate assembly having first and second side plates (e.g., first and second side plates 540, 542) and a plurality of arc splitter plates (e.g., arc splitter plates 546) extending between the first and second side plates, and, in 1006, causing a magnetic flux to be carried in at least some of the arc splitter plates and the extending portion. In some embodiments, a portion of the arc plate assembly 108 is provided directly above the extending portion 216 (See FIG. 6A). As discussed above, flux is carried by at least some of the arc splitter plates by virtue of their very close proximity to the legs 210, 212 of the slot motor 206.

While the invention is susceptible to various modifications and alternative forms, specific embodiments and methods thereof have been shown by way of example in the drawings and are described in detail herein. It should be understood, however, that it is not intended to limit the invention to the particular apparatus, systems, or methods disclosed, but, to the contrary, the intention is to cover all modifications, equivalents and alternatives falling within the scope of the invention.

What is claimed is:

1. A slot motor apparatus, comprising:
a first leg;
a second leg spaced from the first leg, wherein each of the first leg and the second leg has a front face, and a rear face;
a web connected between the first leg and the second leg; and
an extending portion that extends rearward from the rear faces, wherein the first and second legs include a taper in each dimension from a bottom to a top such that the first and second legs are narrower at distances further away from the web.

2. The slot motor apparatus of claim 1, comprising a thickness (te) of the extending portion being greater than a thickness (tw) of the web.

3. The slot motor apparatus of claim 1, wherein the first leg, second leg, web, and extending portion comprise a powdered metal material.

4. The slot motor apparatus of claim 3, wherein the powdered metal material comprises a density between about 6.0 g/cm$^3$ and about 7.5 g/cm$^3$.

5. The slot motor apparatus of claim 1, wherein each of the first leg, second leg, web, and extending portion comprises an epoxy coating layer.

6. The slot motor apparatus of claim 1, wherein the first leg and second leg comprise a non-uniform transverse thickness.

7. The slot motor apparatus of claim 6, wherein the non-uniform transverse thickness comprises a relatively greater thickness adjacent to the rear faces.

8. The slot motor apparatus of claim 1, comprising a vertical cross-sectional shape that varies along a longitudinal direction aligned with the front faces and rear faces.

9. The slot motor apparatus of claim 1, comprising a cross-sectional area through the web and extending portion along a longitudinal direction is greater than a cross sectional area through one of the first leg and the second leg.

10. The slot motor apparatus of claim 1, comprising in combination, a slot motor cover having a first cover portion covering at least a portion of the first leg and a second cover portion covering at least a portion of the second leg, and an epoxy coating layer on each of the first leg, the second leg, the web, and the extending portion.

11. A slot motor-arc plate assembly, comprising:
a slot motor apparatus having a first leg, a second leg spaced from the first leg, wherein each of the first leg and the second leg has a front face and a rear face, a web connected between the first leg and the second leg, and an extending portion that extends rearward from the front faces, wherein the first and second legs include a taper in each dimension from a bottom to a top such that the first and second legs are narrower at distances further away from the web; and
an arc plate assembly provided proximate to the rear faces of the first and second legs and received proximate the extending portion.

12. The slot motor-arc plate assembly of claim 11, wherein a distance (d) between the rear faces of the slot motor and at least some of the arc splitter plates of the arc plate assembly proximate the rear faces is less than about 4 mm.

13. The slot motor-arc plate assembly of claim 12, wherein the distance (d) is less than about 3 mm.

14. The slot motor-arc plate assembly of claim 12, wherein the distance (d) is less than about 2.5 mm.

15. The slot motor-arc plate assembly of claim 11, wherein the slot motor comprises a thickness (te) of the extending portion being greater than a thickness (tw) of the web.

16. The slot motor-arc plate assembly of claim 11, wherein the slot motor comprises a powdered metal material.

17. A circuit breaker, comprising:
a slot motor apparatus having
a first leg,
a second leg spaced from the first leg, wherein each of the first leg and the second leg has a front face and a rear face,
a web connected between the first leg and the second leg, and
an extending portion that extends rearward from the rear faces; and
an arc plate assembly provided proximate to the rear faces of the first leg and second leg and received proximate the extending portion, the arc plate assembly having first and second side plates, and a plurality of arc splitter plates extending between the first and second side plates, wherein the arc plate assembly includes:
a top plate having an arc horn, and
all of the arc splitter plates have a single tab on a first end, double tabs on a second end, and wherein every other one of the arc splitter plates are flipped.

18. The circuit breaker of claim 17, wherein at least two of the arc splitter plates comprise:
a primary recess into a front face; and
a secondary recess formed into the primary recess.

19. A method of operating a slot motor-arc plate assembly, comprising:
providing a slot motor apparatus having a first leg, a second leg spaced from the first leg, wherein each of the first leg and the second leg have a front face and a rear face, a web connected between the first leg and the second leg, and an extending portion that extends rearward from the rear faces, wherein the first and second legs include a taper in each dimension from a bottom to a top such that the first and second legs are narrower at distances further away from the web;
providing an arc plate assembly located proximate to the rear faces of the first and second legs and located proximate the extending portion, the arc plate assembly having first and second side plates, and a plurality of arc splitter plates extending between the first and second side plates; and
causing a magnetic flux to be carried in at least the arc splitter plates and the extending portion.

20. The method of claim 19 comprising providing at least some of the plurality of arc splitter plates at a distance (d) of less than about 4 mm from the rear faces of the first leg and the second leg.

21. The method of claim 19 comprising providing at least some of the plurality of arc splitter plates at a distance (d) of less than about 3 mm from the rear faces of the first leg and the second leg.

22. The method of claim 19 comprising providing at least some of the plurality of arc splitter plates at a distance (d) of less than about 2.5 mm from the rear faces of the first leg and the second leg.

* * * * *